(12) United States Patent
Niizuma

(10) Patent No.: US 9,800,092 B2
(45) Date of Patent: Oct. 24, 2017

(54) WIRELESS POWER-SUPPLYING SYSTEM

(71) Applicant: IHI Corporation, Tokyo (JP)

(72) Inventor: Motonao Niizuma, Tokyo (JP)

(73) Assignee: IHI CORPORATION, Tokyo (JP)

( * ) Notice: Subject to any disclaimer, the term of this patent is extended or adjusted under 35 U.S.C. 154(b) by 392 days.

(21) Appl. No.: 14/595,646

(22) Filed: Jan. 13, 2015

(65) Prior Publication Data

US 2015/0123489 A1 May 7, 2015

Related U.S. Application Data

(63) Continuation of application No. PCT/JP2013/068620, filed on Jul. 8, 2013.

(30) Foreign Application Priority Data

Jul. 26, 2012 (JP) .................................. 2012-165765

(51) Int. Cl.
| | |
|---|---|
| *H02J 17/00* | (2006.01) |
| *F21V 8/00* | (2006.01) |
| *B60L 11/18* | (2006.01) |
| *H02J 5/00* | (2016.01) |
| *H02J 7/02* | (2016.01) |

(52) U.S. Cl.
CPC ............. *H02J 17/00* (2013.01); *B60L 11/182* (2013.01); *G02B 6/0008* (2013.01); *B60L 2230/00* (2013.01); *H02J 5/005* (2013.01); *H02J 7/025* (2013.01); *Y02T 10/7005* (2013.01); *Y02T 10/7088* (2013.01); *Y02T 90/122* (2013.01); *Y02T 90/14* (2013.01)

(58) Field of Classification Search
CPC .................................. H02J 5/005; H02J 17/00
See application file for complete search history.

(56) References Cited

U.S. PATENT DOCUMENTS

| | | | |
|---|---|---|---|
| 8,807,308 B2 | 8/2014 | Suh et al. | |
| 9,345,177 B2 * | 5/2016 | Maekawa | ............... H02J 5/005 |
| 9,443,651 B2 * | 9/2016 | Kagami | .................. H02J 5/005 |

(Continued)

FOREIGN PATENT DOCUMENTS

| | | |
|---|---|---|
| CN | 102333668 A | 1/2012 |
| CN | 102457106 A | 5/2012 |

(Continued)

OTHER PUBLICATIONS

International Search Report, PCT/JP2013/068620, dated Sep. 17, 2013, 2 pgs. (English Translation), 2 pgs. (Japanese Language), 4 pgs. total.

*Primary Examiner* — Hai L Nguyen
(74) *Attorney, Agent, or Firm* — Volpe and Koenig, P.C.

(57) ABSTRACT

A wireless power-supplying system of the present invention includes a ground-based power-supplying device having a power-supplying coil and a vehicle having a power-receiving coil, and performs power supply from the power-supplying coil to the power-receiving coil in a wireless power supply manner. Further, this wireless power-supplying system includes a foreign matter intrusion prevention unit formed of a flexible material transparent to a magnetic field and having flexibility, and provided on the power-supplying coil to fill a space between the power-supplying coil and the power-receiving coil.

7 Claims, 4 Drawing Sheets

(56) References Cited

U.S. PATENT DOCUMENTS

2012/0091989 A1    4/2012   Uramoto et al.
2012/0186927 A1    7/2012   Suh et al.

FOREIGN PATENT DOCUMENTS

| | | |
|---|---|---|
| JP | 06-024356 U | 3/1994 |
| JP | 06-151190 A | 5/1994 |
| JP | 06-311659 A | 11/1994 |
| JP | 2006-345588 A | 12/2006 |
| JP | 2010-226946 A | 10/2010 |
| JP | 2012-019906 A | 2/2012 |
| JP | 2012-029517 A | 2/2012 |
| JP | 2012-085472 A | 4/2012 |
| JP | 2012-196015 A | 10/2012 |
| WO | 2013/128600 A1 | 9/2013 |

\* cited by examiner

WIRELESS POWER-SUPPLYING SYSTEM

This application is a continuation application based on a PCT Patent Application No. PCT/JP2013/068620, filed Jul. 8, 2013, whose priority is claimed on Japanese Patent Application No. 2012-165765, filed Jul. 26, 2012. The contents of both the PCT application and the Japanese Patent Application are incorporated herein by reference.

TECHNICAL FIELD

The present invention relates to a wireless power-supplying system.

BACKGROUND ART

A wireless power-supplying system that performs power supply safely and efficiently without a foreign matter intruding into a space between a power-receiving unit provided on the bottom of a vehicle and a power-supplying unit embedded in a parking space is disclosed in Patent Document 1 below. In the wireless power-supplying system, an insulating isolation material is provided in the space between the power-receiving unit of the vehicle and the power-supplying unit of the parking space, stored in the ground at the time of non-power-supply, and moved into the space between the power-receiving unit and the power-supplying unit by a movable unit at the time of power supply. Particularly, when a metallic foreign matter intrudes, serious problems are caused in power transfer, such as degradation in transfer efficiency due to the influence of the metallic foreign matter.

DOCUMENT OF RELATED ART

Patent Document

[Patent Document 1]
Japanese Unexamined Patent Application, First Publication No. 2010-226946 Summary of Invention Technical Problem However, in the related art, since it is necessary to include the movable unit requiring a complex mechanical mechanism so as to prevent the intrusion of the foreign matter, there is a problem in that effort for maintenance is required. Further, when a hard isolation material is fixed and arranged in the space between the power-receiving unit and power-supplying unit instead of using the movable unit, there is a problem in that tires hit the isolation material and running is obstructed when a vehicle (movable body) enters and exits. Further, there is also a problem in that efficiency of wireless power supply is degraded when a material that is not transparent to the magnetic field is used as the isolation material.

The present invention is conceived in view of the above-described circumstances, and provides a wireless power-supplying system that prevents a foreign matter from intruding into an area likely to cause degradation of efficiency of the wireless power supply and has the following characteristics.

(1) Maintenance requires no effort.
(2) Running of a movable body is not obstructed.
(3) A foreign matter intrusion prevention unit does not degrade efficiency of wireless power supply.

Solution to Problem

In order to achieve the above-described objects, a wireless power-supplying system according to a first aspect of the present invention includes a power-supplying device including a power-supplying coil and a movable body including a power-receiving coil, and performs power supply from the power-supplying coil to the power-receiving coil in a wireless power supply manner, wherein the wireless power-supplying system includes: a foreign matter intrusion prevention unit formed of a flexible material transparent to a magnetic field and having flexibility, the foreign matter intrusion prevention unit being provided on the power-supplying coil to fill a space between the power-supplying coil and the power-receiving coil.

According to a second aspect of the present invention, in the wireless power-supplying system according to the first aspect, the foreign matter intrusion prevention unit is formed of a plurality of hair-shaped members formed of the flexible material and shaped in a brush shape from the power-supplying coil to the power-receiving coil.

According to a third aspect of the present invention, the wireless power-supplying system according to the first or second aspect includes an optical fiber provided to come in contact with the flexible material, a light-emitting means that emits light to an end portion of the optical fiber, and a light-receiving means that receives light emitted from the end portion of the optical fiber, and a determination is made as to whether there is a foreign matter on the flexible material based on an amount of light received by the light-receiving means.

According to a fourth aspect of the present invention, the wireless power-supplying system according to the first or second aspect further includes a linear member provided to come in contact with the flexible material, the linear member transparent to a magnetic field and having elasticity; and a strain detection unit that detects strain of the linear member, and a determination is made as to whether there is a foreign matter on the flexible material based on a detection result of the strain detection unit.

Effects of the Invention

According to the present invention, since the intrusion of the foreign matter into the space between the power-supplying coil and the power-receiving coil can be prevented by the foreign matter intrusion prevention unit without needing a movable unit, which requires a complex mechanical mechanism, maintenance requires no effort. Further, according to the present invention, since the foreign matter intrusion prevention unit is formed of the flexible material, running of the movable body is not obstructed. Further, according to the present invention, since the foreign matter intrusion prevention unit is formed of the material transparent to a magnetic field, a wireless power-supplying system in which efficiency of the wireless power supply is not degraded is provided.

DESCRIPTION OF EMBODIMENTS

Hereinafter, embodiments of the present invention will be described with reference to the drawings.

First Embodiment

Figure 1:
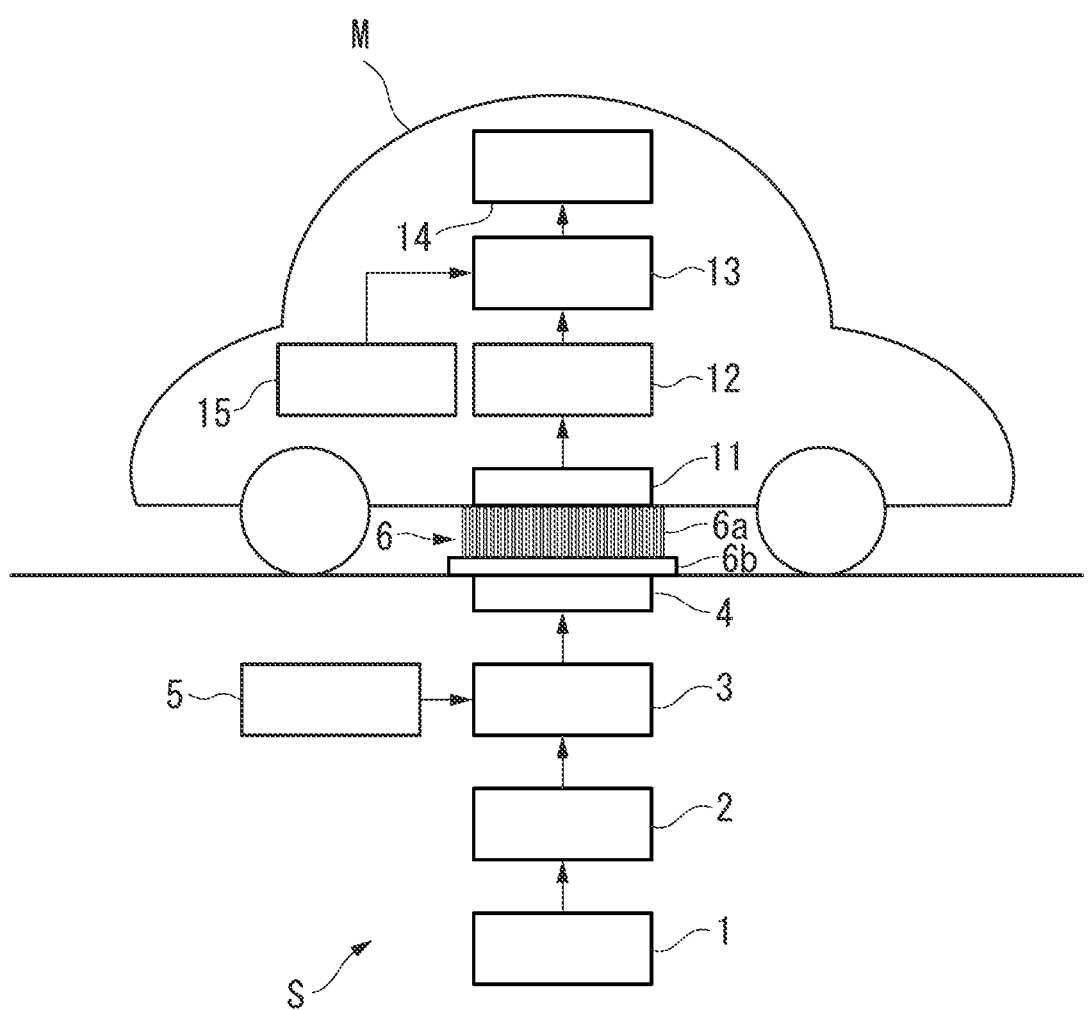
FIG. 1 is a block diagram illustrating a functional configuration of a wireless power-supplying system according to a first embodiment of the present invention.

A wireless power-supplying system according to a first embodiment includes a ground-based power-supplying device S (power-supplying device) embedded in the ground, and a vehicle M (movable body) that receives power from the ground-based power-supplying device S, as illustrated in FIG. 1.

Such a wireless power-supplying system supplies the electric power from the ground-based power-supplying device S to the vehicle M in a wireless manner based on a magnetic field resonance scheme that is one of wireless power supply schemes.

The ground-based power-supplying device S is embedded, for example, in a stop position in a crossroad or a railroad crossing or a parking position of a parking place, and supplies the power to vehicle M parked or stopped in the parking or stopping position in a wireless manner. Such a ground-based power-supplying device S includes a power source 1, a rectifier circuit 2, a power-supplying circuit 3, a power-supplying coil 4, a power supply control unit 5, and a foreign matter intrusion prevention unit 6, as illustrated in FIG. 1.

The power source 1 is an AC electric power supply that includes output terminals connected to input terminals of the rectifier circuit 2, and supplies AC power necessary for power supply to the vehicle M to the rectifier circuit 2. Such a power source 1 is a commercial power supply that supplies, for example, three-phase AC power such as 200 V or 400 V or single-phase AC power of 100 V.

The rectifier circuit 2 includes the input terminals connected to the power source 1, and output terminals connected to the power-supplying circuit 3. Such a rectifier circuit 2 rectifies the AC power supplied from the power source 1 to convert the AC power to DC power, and outputs the DC power to the power-supplying circuit 3.

The power-supplying circuit 3 includes input terminals connected to the rectifier circuit 2, and output terminals connected to both ends of the power-supplying coil 4. Such a power-supplying circuit 3 is a type of inverter that includes a resonance capacitor constituting a power-supplying-side resonance circuit with the power-supplying coil 4, and converts the DC power supplied from the rectifier circuit 2 into AC power at a higher frequency (high frequency electric power) than the AC power of the power source 1 based on a control instruction input from the power supply control unit 5, and supplies the AC power to the power-supplying coil 4.

The power-supplying coil 4 is a helical coil having a predetermined coil diameter, and is installed in the parking and stopping position described above in a posture in which a coil axis thereof is in an up and down direction (vertical direction) and in a state in which the power-supplying coil 4 is exposed on a ground surface or a state in which the power-supplying coil 4 is molded in a nonmagnetic material or a nonconductive material, such as plastic. Both ends of the power-supplying coil 4 are connected to the output terminals of the power-supplying circuit 3, and high frequency electric power is supplied from the power-supplying circuit 3 to generate a magnetic field such that the power-supplying coil 4 supplies power to the vehicle M in a wireless manner. The power supply control unit 5 is a software type control device including a microprocessor, a memory and the like, functions based on a predetermined power supply control program, and controls the power-supplying circuit 3.

Figure 2:
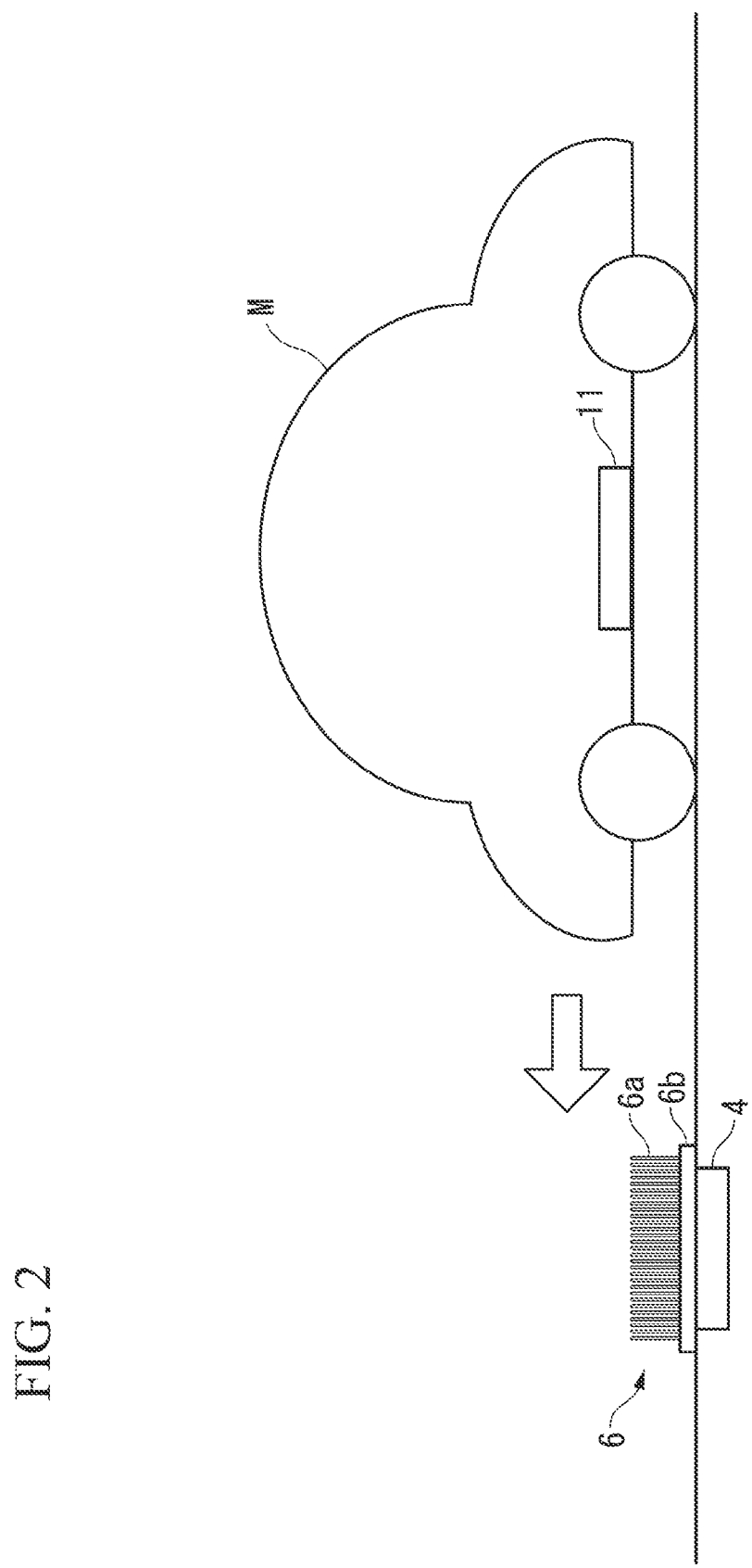
FIG. 2 is a diagram illustrating a foreign matter intrusion prevention unit before a vehicle approaches a ground-based power-supplying device in the first embodiment of the present invention.

As illustrated in FIGS. 1 and 2, the foreign matter intrusion prevention unit 6 is provided on the power-supplying coil 4, and includes a plurality of hair-shaped members 6a formed of a flexible material (for example, plastic or rubber) transparent to a magnetic field (that is, nonmagnetic and nonconductive) and having flexibility, and a sheet 6b that is formed of a flexible material transparent to a magnetic field similarly to the hair-shaped members 6a and in which the hair-shaped members are implanted. The foreign matter intrusion prevention unit 6 is something like an artificial turf formed of the hair-shaped members 6a and the sheet 6b in a brush shape from the power-supplying coil 4 to the power-receiving coil 11. In this foreign matter intrusion prevention unit 6, the hair-shaped members 6a have such lengths so that the hair-shaped members 6a reach an end face (lower face) of the power-receiving coil 11 of the vehicle M to be described below when the vehicle M parks on the ground-based power-supplying device S. That is, the foreign matter intrusion prevention unit 6 is provided to fill a space between the power-supplying coil 4 and the power-receiving coil 11 of the vehicle M to be described below.

The vehicle M is, for example, an electric car or a hybrid vehicle operated by a vehicle driver that runs on a road using electrical power as a power source. Such a vehicle M includes a power-receiving coil 11, a power-receiving circuit 12, a charging circuit 13, a battery 14, and a power reception control unit 15, as illustrated in FIG. 1. Further, although not shown in FIG. 1, the vehicle M includes components necessary for running, such as a running motor, an operation handle, a brake, and an engine (in the case of a hybrid vehicle).

The power-receiving coil 11 is a helical coil having substantially the same coil diameter as the power-supplying coil 4 of the ground-based power-supplying device S, and is provided in a bottom of the vehicle M in a posture in which a coil axis thereof is in an up and down direction (vertical direction) to be able to face the power-supplying coil 4. Both ends of the power-receiving coil 11 are connected to input terminals of the power-receiving circuit 12, and when a magnetic field from the power-supplying coil 4 acts, an electromotive force is generated through electromagnetic induction and is output to the power-receiving circuit 12.

The power-receiving circuit 12 includes the input terminals connected to both ends of the power-receiving coil 11, and output terminals connected to input terminals of the charging circuit 13. Such a power-receiving circuit 12 is a type of rectifier circuit that includes a resonance capacitor constituting the power-receiving-side resonance circuit with the power-receiving coil 11, converts AC power supplied from the power-receiving coil 11 into DC power, and supplies the DC power to the charging circuit 13. Further, capacitance of the resonance capacitor of the power-receiving circuit 12 is set so that a resonance frequency of the power-supplying-side resonance circuit and a resonance frequency of the power-receiving-side resonance circuit are the same frequency.

The charging circuit 13 includes input terminals connected to the output terminals of the power-receiving circuit 12, and output terminals connected to input terminals of the battery 14, and charges the battery 14 with the power (DC power) supplied from the power-receiving circuit 12. The battery 14 is a rechargeable battery (for example, a secondary battery such as a lithium ion battery or a nickel metal hydride battery) mounted on the vehicle M, and supplies driving power to the running motor or the like, which is not shown.

The power reception control unit 15 is a software type control unit including, for example, a microprocessor or a memory, and functions based on a predetermined program control program to control the charging circuit 13.

Next, an operation of the wireless power-supplying system configured in this way will be described.

Figure 3:
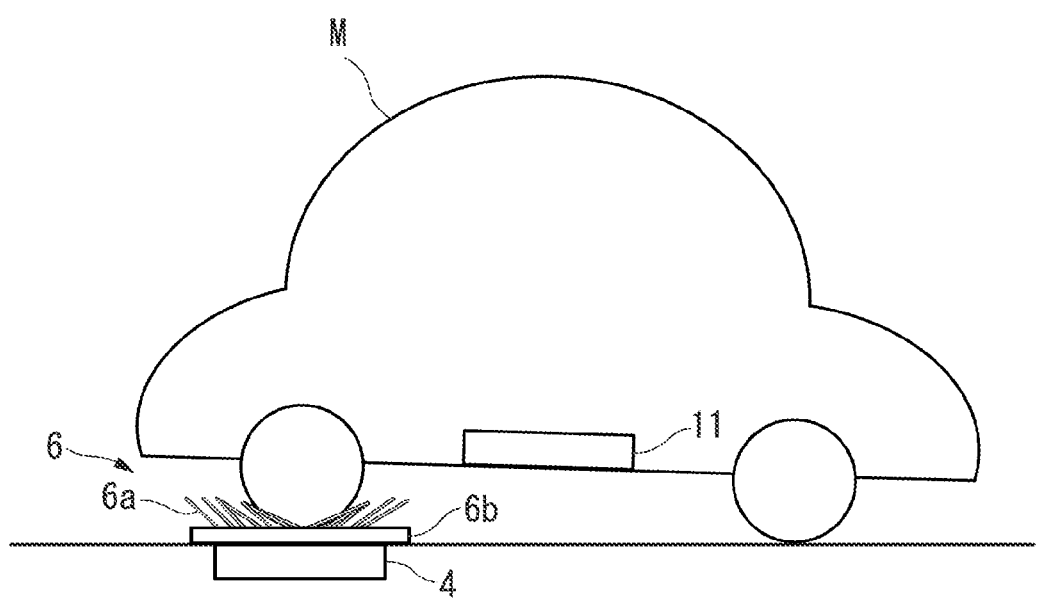
FIG. 3 is a diagram illustrating the foreign matter intrusion prevention unit when the vehicle passes through the foreign matter intrusion prevention unit in the first embodiment of the present invention.

First, when the vehicle M is parked in the parking space in which the ground-based power-supplying device S is embedded, the driver runs the vehicle M and enters the parking space in which the power-supplying coil 4 of the ground-based power-supplying device S is embedded, as illustrated in FIG. 2. Here, when a course through which tires of the vehicle M pass on the power-supplying coil 4 is taken, the foreign matter intrusion prevention unit 6 lies under the tires of the vehicle M. That is, since the hair-shaped members 6a of the foreign matter intrusion prevention unit 6 are formed of a flexible material, the hair-shaped members 6a are flattened by the weight of the vehicle M, as illustrated in FIG. 3. Thus, the running of the vehicle M is not obstructed by the foreign matter intrusion prevention unit 6. Also, after the tires of the vehicle M pass through on the foreign matter intrusion prevention unit 6, the hair-shaped members 6a of the foreign matter intrusion prevention unit 6 restore to their original shape.

Further, if the vehicle M enters the parking space and the foreign matter intrusion prevention unit 6 is located under the bottom side of the vehicle M, a tip of the foreign matter intrusion prevention unit 6 (the hair-shaped members 6a) comes in contact with the bottom side of the vehicle M in a state in which the tip abuts the bottom side. That is, the vehicle M runs while the tip of the foreign matter intrusion prevention unit 6 (hair-shaped members 6a) comes in contact with the bottom side. Accordingly, even when a foreign matter is attached to a surface of the foreign matter intrusion prevention unit 6, the foreign matter is brushed off of the foreign matter intrusion prevention unit 6 due to movement of the vehicle M and can be removed from the foreign matter intrusion prevention unit 6.

Then, the driver drives the vehicle M, runs the vehicle M to the installation place of the ground-based power-supplying device S, and stops the vehicle M so that a positional relationship in which the power-supplying coil 4 and the power-receiving coil 11 face each other is obtained. When the vehicle M stops so that the above positional relationship is obtained, the tip of the foreign matter intrusion prevention unit 6 (the hair-shaped members 6a) comes in contact with the power-receiving coil 11 of the vehicle M in a state in which the tip abuts the power-receiving coil 11. That is, the foreign matter intrusion prevention unit 6 is arranged to fill the space between an end face (an upper surface) of the power-supplying coil 4 and an end face (a lower surface) of the power-receiving coil 11. Therefore, a lightweight foreign matter that does not have sufficient weight to bend the hair-shaped members 6a to cause a space of a size equal to or more than a size of the foreign matter, that is, a size at which the foreign matter can intrude, is obstructed by the hair-shaped members 6a of the foreign matter intrusion prevention unit 6 and cannot intrude into the space between the power-supplying coil 4 and the power-receiving coil 11.

On the other hand, in the ground-based power-supplying device S, the power supply control unit 5 recognizes the position of the vehicle M from an output of a position sensor such as a sound wave sensor or an optical sensor which is not shown. When the power supply control unit 5 detects that the vehicle M is above the ground-based power-supplying device S based on the output of the position sensor such as the sound wave sensor or the optical sensor, the power supply control unit 5 causes the power-supplying circuit 3 to start an operation of supplying the power to the battery 14. Meanwhile, in the vehicle M, the power reception control unit 15 appropriately charges the battery 14 by controlling the charging circuit 13 while monitoring a charge state of the battery 14. In this case, the space between the power-supplying coil 4 and the power-receiving coil 11 is filled by the hair-shaped members 6a and the sheet 6b of the foreign matter intrusion prevention unit 6, but since the hair-shaped members 6a and the sheet 6b are formed of a material transparent to a magnetic field, the magnetic field generated in the space between the power-supplying coil 4 and the power-receiving coil 11 is not obstructed and efficiency of the wireless power supply is not degraded.

According to the first embodiment, since the intrusion of the foreign matter into the space between the power-supplying coil 4 and the power-receiving coil 11 can be prevented by the foreign matter intrusion prevention unit 6 without needing a movable unit, which requires a complex mechanical mechanism, maintenance requires no effort. Further, according to the first embodiment, since the foreign matter intrusion prevention unit 6 is formed of the flexible material, running of the vehicle M is not obstructed. Further, according to the first embodiment, since the foreign matter intrusion prevention unit 6 is formed of the material transparent to a magnetic field, efficiency of the wireless power supply is not degraded.

Second Embodiment

Next, a wireless power-supplying system according to a second embodiment will be described.

In the wireless power-supplying system according to the second embodiment, a foreign matter detection unit 7 is added to the ground-based power-supplying device S of the first embodiment. The other components are the same as those in the first embodiment. Thus, description of the same components as those in the first embodiment will be omitted in the second embodiment.

Figure 4A:
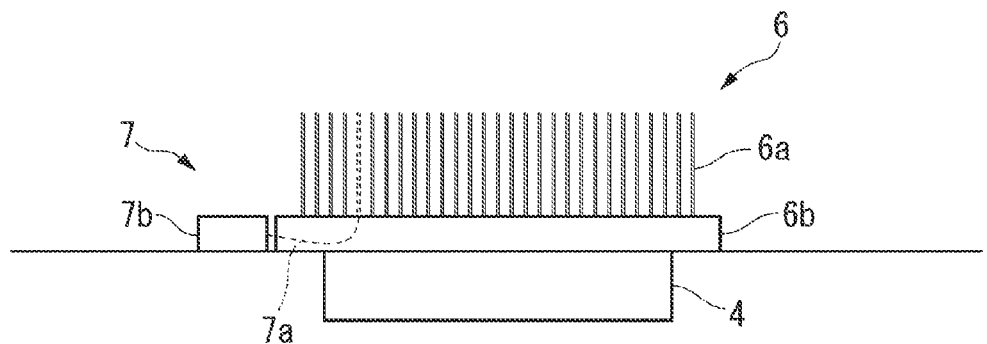
FIG. 4A is a diagram illustrating a foreign matter detection unit in a second embodiment of the present invention.

The foreign matter detection unit 7 includes, as illustrated in FIG. 4A, an optical fiber 7a and an optical measuring device 7b to detect a foreign matter such as a wrench made of metal present on the foreign matter intrusion prevention unit 6, which has a predetermined weight that is capable of causing bending of the hair-shaped members 6a such that a space equal to or larger than the foreign matter into which the foreign matter can intrude is formed. Further, the optical measuring device 7b includes a light-emitting means and a light-receiving means in this embodiment.

The optical fiber 7a is an optical fiber cable of a single core line formed of plastic made of acrylic transparent to a magnetic field, and its one end is connected to the optical measuring device 7b. The one end of the optical fiber 7a is arranged along a surface of the sheet 6b of the foreign matter intrusion prevention unit 6, and the optical fiber 7a is bent in a predetermined position so that it's the other end to be directed upward, as illustrated in FIG. 4A. The optical fiber 7a is arranged in a state in which the optical fiber 7a is close to the densely implanted hair-shaped members 6a. Further, the other end of the optical fiber 7*a* is trimmed at the same height as tips of the hair-shaped members 6*a* of the foreign matter intrusion prevention unit 6, and is subjected to anti-reflective processing so that no reflection of light occurs. Further, while only one optical fiber 7*a* is drawn in FIG. 4A, it is preferable for a plurality of optical fibers to be provided, scattered among the hair-shaped members. While the optical fiber 7*a* is present in the space between the power-supplying coil 4 and the power-receiving coil 11, the magnetic field generated in the space between the power-supplying coil 4 and the power-receiving coil 11 is not obstructed and efficiency of the wireless power supply is not degraded since the optical fiber 7*a* is formed of a material transparent to a magnetic field.

The optical measuring device 7*b* emits measurement light (a laser beam or amplified spontaneous emission light (ASE light)) to the one end of the optical fiber 7*a*, and receives reflected light that is reflected by and returned from the optical fiber 7*a*. The optical measuring device 7*b* measures an amount of received light and outputs a result of a measurement to the power supply control unit. Such an optical measuring device 7*b* is arranged to avoid a portion directly above the power-supplying coil 4 so as not to affect the magnetic field between the power-supplying coil 4 and the power-receiving coil 11, thus preventing degradation of efficiency of the wireless power supply. Further, when there is a change in a received light amount based on the measurement result input from the optical measuring device 7*b*, the power supply control unit 5 determines that the foreign matter is on the hair-shaped members 6*a* of the foreign matter intrusion prevention unit 6.

Next, an operation of the second embodiment configured in this way will be described.

For example, when a foreign matter (for example, a wrench made of metal) having a predetermined weight is on the hair-shaped members 6*a* of the foreign matter intrusion prevention unit 6, the hair-shaped members 6*a* and the optical fiber 7*a* are pressed and bent due to the weight of the foreign matter. Therefore, the optical fiber 7*a* is deformed, a light amount leaking from the optical fiber is changed, and the received light amount measured by the optical measuring device 7*b* is changed. When the measurement result input from the optical measuring device 7*b* indicates that there is a change in a received light amount, the power supply control unit 5 determines that the foreign matter is on the hair-shaped members 6*a* of the foreign matter intrusion prevention unit 6. Also, when the power supply control unit 5 determines that the foreign matter is on the hair-shaped members 6*a*, the power supply control unit 5 controls the power-supplying circuit 3 to stop the power supply. Further, when a notification means such as a display unit that displays an image, a light-emitting unit that emits light or a sound generation unit that generates sound are provided, the power supply control unit 5 notifies the outside that the foreign matter is on the hair-shaped members 6*a* of the foreign matter intrusion prevention unit 6 using this notification means.

According to the second embodiment, since presence of the foreign matter can be detected when the foreign matter having the predetermined weight is on the foreign matter intrusion prevention unit 6, an effect that the power supply operation can be stopped when the foreign matter is on the foreign matter intrusion prevention unit 6 is obtained, in addition to the effects of the first embodiment.

Third Embodiment

Next, a wireless power-supplying system according to a third embodiment will be described.

In the wireless power-supplying system according to the third embodiment, a foreign matter detection unit 8 is added to the ground-based power-supplying device S of the first embodiment. The other components are the same as those in the first embodiment. Thus, description of the same components as those in the first embodiment will be omitted in the third embodiment.

Figure 4B:
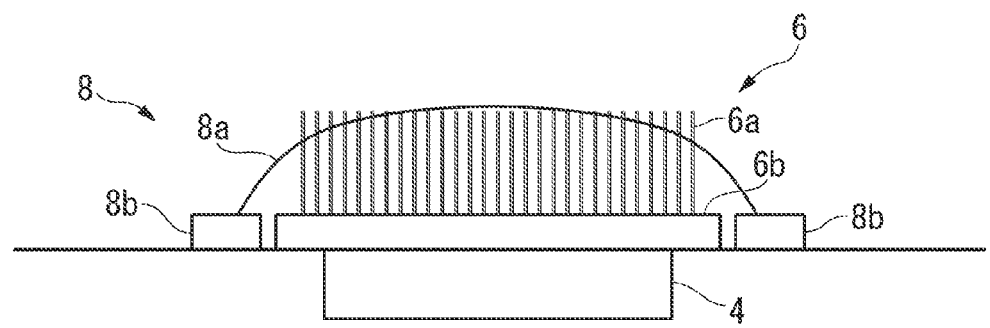
FIG. 4B is a diagram illustrating a foreign matter detection unit in a third embodiment of the present invention.

The foreign matter detection unit 8 includes, as illustrated in FIG. 4B, a linear member 8*a* and a strain detection unit 8*b* to detect a foreign matter such as a wrench made of metal present on the foreign matter intrusion prevention unit 6, which has a predetermined weight that is capable of causing bending of the hair-shaped members 6*a* such that a space equal to or larger than the foreign matter into which the foreign matter can intrude is formed.

The linear member 8*a* is formed of a material transparent to a magnetic field and having elasticity, such as FRP (Fiber-Reinforced Plastics), and provided to span the foreign matter intrusion prevention unit 6, as illustrated in FIG. 4B. Further, the strain detection unit 8*b* is provided at both ends of the linear member 8*a*. Further, while only one linear member 8*a* is drawn in FIG. 4B, it is preferable for a plurality of linear members to be provided in parallel to or to intersect each other. While the linear member 8*a* is in the space between the power-supplying coil 4 and the power-receiving coil 11, the magnetic field generated in the space between the power-supplying coil 4 and the power-receiving coil 11 is not obstructed and efficiency of the wireless power supply is not degraded since the linear member 8*a* is formed of a material transparent to the magnetic field.

The strain detection unit 8*b* is a sensor (for example, a strain gauge) that is provided at both ends of the linear member 8*a* to detect strain of the linear member 8*a* and output a detection result to the power supply control unit 5. Such a strain detection unit 8*b* is arranged to avoid a portion directly above the power-supplying coil 4 so as not to affect the magnetic field between the power-supplying coil 4 and the power-receiving coil 11, thus preventing degradation of the efficiency of the wireless power supply. Further, when the detection result input from the strain detection unit 8*b* indicates that the strain occurs in the linear member 8*a*, the power supply control unit 5 determines that the foreign matter is on the hair-shaped members 6*a* of the foreign matter intrusion prevention unit 6.

Next, an operation of the third embodiment configured in this way will be described.

For example, when a foreign matter (for example, a wrench made of metal) having the predetermined weight is on the hair-shaped members 6*a* of the foreign matter intrusion prevention unit 6, the hair-shaped members 6*a* and the linear member 8*a* are pressed and bent due to the weight of the foreign matter. Therefore, the strain of the linear member 8*a* is detected by the strain detection unit 8*b*. When the measurement result input from the strain detection unit 8*b* indicates that the strain occurs in the linear member 8*a*, the power supply control unit 5 determines that the foreign matter is on the hair-shaped members 6*a* of the foreign matter intrusion prevention unit 6. Also, when the power supply control unit 5 determines that the foreign matter is on the hair-shaped members 6*a*, the power supply control unit 5 controls the power-supplying circuit 3 to stop the power supply. Further, when a notification means such as a display unit, a light-emitting unit that emits light, or a sound generation unit is provided, the power supply control unit 5 notifies the outside of the presence of the foreign matter on the hair-shaped members 6*a* of the foreign matter intrusion prevention unit 6 using this notification means.

According to the third embodiment, since the presence of the foreign matter can be detected when the foreign matter having a predetermined weight is on the foreign matter intrusion prevention unit 6, an effect that the power supply operation can be stopped when the foreign matter is on the foreign matter intrusion prevention unit 6 is obtained, in addition to the effects of the first embodiment.

While the embodiments of the present invention have been described above, the present invention is not limited to the embodiments, and for example, the following modifications can be considered.

(1) In the above embodiments, the power-supplying device is the ground-based power-supplying device S embedded in the ground surface and the movable body is the vehicle M running on the ground, but the present invention is not limited thereto. For example, the power-supplying device may be embedded in a concrete floor of a parking place having a multi-storied floor or may be attached to a steel member supporting the vehicle in an automated parking garage via a material that does not affect a magnetic field. Further, the power-supplying device may be an underwater power-supplying device installed underwater, and the movable body may be an underwater vehicle that moves underwater.

(2) The vehicle M may be a vehicle that is automatically driven without a vehicle driver.

(3) In the above embodiments, the magnetic field resonance scheme is adopted as a method of supplying electric power in a wireless manner, but an electromagnetic induction scheme may be adopted.

(4) The power-supplying coil 4 or the power-receiving coil 11 is not limited to the helical coil. Any form or shape of coil such as a solenoid shape may be adopted as long as wireless power supply is possible between the power-supplying coil 4 and the power-receiving coil 11, or both of the coils may have different forms, shapes, and sizes.

(5) In the above embodiments, while something like an artificial turf formed in a brush shape is used as the foreign matter intrusion prevention unit 6, for example, something that is sponge-shaped and elastic and is deformed under the weight of the vehicle M so that it does not obstruct passage of the vehicle M thereover may be used instead.

(6) In the second embodiment, the optical measuring device 7b including both the light-emitting means and the light-receiving means is connected to one end of the optical fiber 7a, but the present invention is not limited thereto. For example, the optical fiber 7a is provided to span the foreign matter intrusion prevention unit 6, similar to the linear member 8a illustrated in FIG. 4B, the light-emitting means is connected to one end of such an optical fiber 7a, and the light-receiving means is connected to the other end thereof. A determination may be made as to whether there is a foreign matter on the hair-shaped members 6a of the foreign matter intrusion prevention unit 6 based on a change in an amount of light received by the light-receiving means using the fact that the optical fiber 7a is deformed due to the weight of the foreign matter, and an amount of light leaking from the optical fiber is changed.

Further, in the present invention, "plurality of" means any number equal to or more than at least 2.

INDUSTRIAL APPLICABILITY

A wireless power-supplying system in which maintenance requires no effort and running of a movable body is not obstructed is provided.

DESCRIPTION OF REFERENCE SIGNS

S Ground-based power-supplying device
M Vehicle
1 Power source
2 Rectifier circuit
3 Power-supplying circuit
4 Power-supplying coil
5 Power supply control unit
6 Foreign matter intrusion prevention unit
6a Hair-shaped member
6b Sheet
11 Power-receiving coil
12 Power-receiving circuit
13 Charging circuit
14 Battery
15 Power reception control unit
7, 8 Foreign matter detection unit
7a Optical fiber
7b Optical measuring device (light-emitting means and light-receiving means)
8a Linear member
8b Strain detection unit

The invention claimed is:

1. A wireless power-supplying system comprising a power-supplying device including a power-supplying coil and a movable body including a power-receiving coil, and performing power supply from the power-supplying coil to the power-receiving coil in a wireless power supply manner, wherein the wireless power-supplying system includes:
   a foreign matter intrusion prevention unit formed of a flexible material transparent to a magnetic field and having flexibility, the foreign matter intrusion prevention unit being provided on the power-supplying coil to fill a space between the power-supplying coil and the power-receiving coil,
   wherein the foreign matter intrusion prevention unit is flattened by the contact of the movable body.

2. The wireless power-supplying system according to claim 1,
   wherein the foreign matter intrusion prevention unit is formed of a plurality of hair-shaped members formed of the flexible material and shaped in a bush shape from the power-supplying coil to the power-receiving coil.

3. The wireless power-supplying system according to claim 2, comprising:
   a linear member provided to come in contact with the flexible material, the linear member transparent to a magnetic field and having elasticity; and
   a strain detection unit that detects strain of the linear member, wherein a determination is made as to whether there is a foreign matter on the flexible material based on a detection result of the strain detection unit.

4. The wireless power-supplying system according to claim 2, comprising:
   an optical fiber provided to come in contact with the flexible material; and
   a light-emitting means that emits light to an end portion of the optical fiber, and a light-receiving means that receives light emitted from the end portion of the optical fiber,
   wherein a determination is made as to whether there is a foreign matter on the flexible material based on an amount of light received by the light-receiving means.

5. The wireless power-supplying system according to claim 1, comprising:

a linear member provided to come in contact with the flexible material, the linear member transparent to a magnetic field and having elasticity; and a strain detection unit that detects strain of the linear member, wherein a determination is made as to whether there is a foreign matter on the flexible material based on a detection result of the strain detection unit.

6. The wireless power-supplying system according to claim 1, comprising:

an optical fiber provided to come in contact with the flexible material; and a light-emitting means that emits light to an end portion of the optical fiber, and a light-receiving means that receives light emitted from the end portion of the optical fiber, wherein a determination is made as to whether there is a foreign matter on the flexible material based on an amount of light received by the light-receiving means.

7. A power-supplying device comprising a power-supplying coil performing power supply to the power-receiving coil provided on a movable body in a wireless power supply manner, wherein the power-supplying device includes:

a foreign matter intrusion prevention unit formed of a flexible material transparent to a magnetic field and having flexibility, the foreign matter intrusion prevention unit being provided on the power-supplying coil to fill a space between the power-supplying coil and the power-receiving coil, wherein the foreign matter intrusion prevention unit is flattened by the contact of the movable body.

* * * * *